United States Patent Office 2,802,768
Patented Aug. 13, 1957

2,802,768

METHOD OF TREATING FUNGUS INFECTED SOIL EMPLOYING A HALOKETONE

Lloyd J. Meuli, Long Beach, Calif., assignor to The Dow Chemical Company, Midland, Mich., a corporation of Delaware No Drawing. Application August 2, 1954,
Serial No. 447,377

8 Claims. (Cl. 167—22)

The present invention relates to the raising of crops and is particularly concerned with an agronomical practice and composition for improving the emergence, seedling growth and harvest of crop plants.

It is an object of the present invention to provide a new and improved agronomical practice for the raising of crops. Another object is the provision of a practice which will include the treatment of soil or growth media and still permit the immediate utilization of the treated soil for crop purposes. A further object is the provision of a method for protecting the roots of plants from the attack of soil-dwelling fungi. Yet another object is the provision of a novel composition adapted to be employed in the new practice for raising crops. Other objects will become apparent from the following specification and claims.

The new agronomical practice comprising treating soil or growth media with a halo-compound of the formula

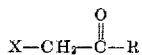

$$X-CH_2-\overset{O}{\underset{\|}{C}}-R$$

wherein X is chlorine or bromine and R is an alkyl radical containing from 2 to 4 carbon atoms, inclusive, to benefit crops grown in the treated soil. Such practice protects the crops against attack by soil-dwelling fungi and improves the emergence and growth of seedlings as well as the crop harvest.

The halo-compounds are non-flammable, stable liquid materials which are somewhat soluble in many organic solvents and water and are adapted readily and conveniently to be distributed in soil or other growth media. When distributed in the soil the compounds accomplish a rapid kill of soil-dwelling fungi which attack plant roots. A particularly outstanding advantage of the present invention is that the growth media may be impregnated with the toxicant compounds in concentrations required for the protection of the crop plants without adverse effect upon the germination of seeds or the growth of transplants planted in the soil immediately following treatment. Thus, the undesirable waiting period oftentimes encountered between treating and seeding is unnecessary in the present practice. It is a further advantage that the compounds permeate the growth media for a short distance from the point of application depending upon the temperature, moisture content, compactness and physical consistency of the media.

The distribution of an effective or fungicidal dosage of the compounds in soil or growth media is essential for the practice of the present invention. In general, good results are obtained when the compounds are distributed through the growth media in the amount of from 5 to 50 parts by weight per million parts by weight of the media. Following such treatment, the soil may be immediately seeded or otherwise employed for crop purposes, if desired. In field applications, the compounds may be applied to and mixed with the soil at a dosage of from about 0.4 pound to 400 pounds or more per acre, and through such a cross section of the soil as to provide for the presence therein of an effective concentration of the treating agent. In general in over-all field applications, it is usually preferred that the compounds be distributed to a depth of at least two inches below the soil surface and at a dosage of at least 1.8 pounds per acre inch of soil. Oftentimes it is desirable to distribute the compounds to a depth of at least 24 inches to avoid reinfestation of the soil from deep-dwelling fungal organisms. In applications to the furrow seed row for the suppression of seedling disease, it is desirable that the compounds be distributed upon the surfaces of the furrow at a dosage of at least 0.15 pound per acre of furrow soil surface. After such treatment, the furrow is seeded and the soil compacted about the seed according to conventional practice. In the row treatment of existing vegetation, the products may be employed with known side-dressing techniques.

In carrying out the method of the present invention, the underground parts of crops are protected against attack by soil-dwelling fungi by distributing in the soil or growth media the unmodified compounds. However, the present method also embraces the employment of a liquid or dust composition containing the compounds. In such usage, the compounds may be modified with one or more of a plurality of additaments or fungicide adjuvants including solvents or other liquid carriers, surface active dispersing agents and finely divided inert solids. Depending upon the concentration of the compounds, such augmented compositions are adapted to be distributed in the soil, or employed as concentrates and subsequently diluted with additional inert carrier to produce the ultimate treating compositions. The required amount of the compounds may be supplied per acre treated in from 5 to 27,000 gallons or more of the liquid carrier or in from about 20 to 2,000 pounds of the solid carrier.

The exact concentration of the compounds to be employed in compositions for the treatment of growth media may vary provided the required dosage of effective agent is supplied. The concentration of toxicant in liquid compositions employed to supply the desired dosage generally is from about 0.001 to 50 percent by weight, although as high a concentration as 90 percent by weight may be employed. In dusts, the concentration of the effective agent may be from about 1 to 20 percent by weight. In compositions to be employed as concentrates, the compounds may be present in a concentration of from about 5 to 95 percent by weight.

Liquid compositions containing the desired amount of effective agent may be prepared by dissolving the toxicant in an organic liquid such as acetone, methylene chloride, chlorobenzene, and petroleum distillates, or by dispersing the toxicant in water with or without the aid of a suitable surface active dispersing agent such as an ionic or non-ionic dispersing and emulsifying agent. The preferred organic solvent carriers are those which are adapted to accomplish the penetration and impregnation of the soil with the toxicant compounds, and are of such volatility as to evaporate from the growth media and leave little permanent residue therein. Particularly desirable carriers are the petroleum distillates boiling almost entirely under 400° F. at atmospheric pressure and having a flash point about about 80° F.

The aqueous compositions to be employed in the present method may contain one or more water-immiscible solvents for the compounds. In such compositions, the carrier comprises an aqueous emulsion, i. e. a mixture of water-immiscible solvent, emulsifying agent and water. The choice of dispersing and emulsifying agent and the amount thereof employed is dictated by the nature of the composition type and by the ability of the agent to facilitate the dispersion of the effective agent in the aqueous carrier to produce the desired composition. Dispersing and emulsifying agents which may be employed in the compositions include the condensation products of alkylene oxides with phenols and organic acids, alkyl aryl sulfonates, polyoxyethylene derivatives of sorbitan esters, complex ether alcohols, mahogany soaps and the like.

In the preparation of dust compositions, the compounds are dispersed in and on a finely divided solid such as talc, chalk, gypsum and the like. In such operations, the finely divided carrier is mixed or wet with the toxicant or a solution thereof in a volatile organic solvent. Similarly, dust compositions containing the compounds may be prepared from various of the solid surface-active dispersing agents such as bentonite, fuller's earth, attapulgite and other clays. Depending upon the proportion of ingredients, these dust compositions may be employed as concentrates and subsequently diluted with additional solid surface-active dispersing agent or with talc, chalk, gypsum and the like to obtain the desired amount of active ingredient in a composition adapted to be distributed in soil. Also, such concentrate dust compositions may be dispersed in water, with or without the aid of a dispersing agent, to form aqueous soil treated compositions.

A further embodiment of the present invention is a novel composition comprising growth media or soil in admixture with an effective concentration of the compounds.

When operating in accordance with the present invention, the soil or growth media may be impregnated in any convenient fashion with the compounds, i. e. by simple mixing with the growth media, by applying to the surface of soil and thereafter dragging or discing into the soil to the desired depth or by employing a liquid carrier to accomplish the penetration and impregnation. In another method, the compounds are distributed upon the surfaces of the seed furrow and the furrow thereafter planted and compacted about the seed. In general, it is desirable that the distribution be carried out at a soil temperature of 40° F. or higher since the effectiveness of the toxicants may be somewhat reduced at lower temperatures.

In a preferred embodiment, the method of the present invention is carried out in soil having a moisture content of from about 50 to 100 percent of the moisture equivalent of the soil. When operating under such soil conditions, maximum controls of fungal organisms are obtained. Thompson, L. M., in Soils and Soil Fertility, McGraw Book Company, Inc. (1952) defines the moisture equivalent of a soil as equal to the percentage of water retained by wet soil after being centrifuged at 1000 times gravity. This equivalent is about the same as the so-called field capacity which may be defined as the moisture condition of the soil when downward movement of water into the soil has virtually ceased. The moisture equivalent or field capacity is dependent primarily upon the percentage of organic matter in the soil, the size of the soil particles and the porosity of the soil.

In a further method, the distribution may be accomplished by introducing the toxicant in the water employed to irrigate the soil. In this method, the amount of water may be varied in accordance with the moisture equivalent of field capacity of the soil in order to obtain the desired depth of distribution of the toxicant at a soil moisture content equal to the moisture equivalent. When operating in accordance with such method, toxicant distributions to a depth of from two to four feet or more may be conveniently obtained.

The following examples illustrate the invention but are not to be construed as limiting.

Example 1

1-bromo-3-methyl-2-butanone was employed for the treatment of a sandy loam soil heavily infested with the fungus organisms, *Fusarium solani*, *Pythium spp*. and *Rhizoctonia solani*. At the time of treatment the soil had a moisture content of 7 percent. This moisture content is about 50 percent of the moisture equivalent or field capacity of the soil. In the treating operations, the soil was placed in sealable vessels and separately injected with an aqueous solution containing 6 grams of the butanone compound per liter of ultimate mixture and the vessels sealed. The amounts of aqueous composition employed were sufficient to supply a concentration of 10 parts by weight of the butanone compound per million parts by weight of soil. The soil in the sealed vessels was then mechanically mixed to ensure uniform distribution of the toxicant composition therein. After 30 minutes of mixing, the soil was removed from the vessels, spread in containers to a depth of 3.5 inches and seeded to lima beans. In a check operation, the same infested but untreated soil was similarly spread in containers and seeded with lima beans. The containers of seeded soil were then watered to a soil moisture content of about field capacity and thereafter placed in a cold room at 45° F. and 85 percent relative humidity to provide conditions conducive to slow germination of the seed and favorable for rapid infestation of the seed with the complex of root-rot fungi. After one week in the cold room, the containers of seeded soil were removed and thereafter maintained in a greenhouse according to conventional practices with regard to light, temperature, humidity and moisture. During the subsequent growing period, there was observed no adverse effect upon germination and growth of seedlings attributable to the butanone compound.

Three weeks after seeding, the containers were inspected to determine the percentage emergence of seedlings and the plants lifted, roots washed and thereafter examined to determine the presence of disease-free seedlings. From the examination, there was found to be a 100 percent emergence in the treated soil with 91 percent of the emerged seedlings being free of root-rot disease. In the check containers there was found an emergence of 15 percent with only 17 percent of the emerged seedlings being free of disease.

Example 2

1-bromo-2-butanone was similarly employed for the treatment of the fungal infested soil of example. The treating, mixing and seeding operations and subsequent growth conditions were all as previously described. The compositions employed in the treating operations were aqueous solutions containing 15 and 6 grams of the butanone compound per liter of ultimate mixture. These compositions were employed in an amount sufficient to supply, respectively, 25 parts and 10 parts by weight of toxicant per million parts by weight of soil. During the period of germination and growth there was observed no adverse effect upon germination and growth of seedlings attributable to the butanone compound.

Six weeks after seeding, the containers were inspected to determine the percentage emergence of seedlings and the plants lifted, roots washed and thereafter examined in order to determine the presence of disease-free plants. The results are set forth in the following table:

| Concentration of Treating Compound in Soil in Parts by Weight per Million Parts by Weight of Soil | Percent Seedling Emergence | Percent Disease-Free Seedlings |
| --- | --- | --- |
| 10 | 97 | 92 |
| 25 | 95 | 100 |
| Checks | 15 | 17 |

Example 3

Various of the halo-ketone compounds were employed for the treatment of the previously described fungal infested soil. In the treating operations, the soil was placed in sealable containers and separately injected with aqueous solutions containing varying amounts of one of the toxicants per liter of ultimate mixture and in amounts sufficient to supply various concentrations of toxicant in the soil. Following the treatment, the containers were sealed and the soil therein mechanically mixed to insure uniform distribution of the toxicant compositions. After mixing, the containers of treated soil were incubated at an average temperature of about 25° C. In a check operation, sealed containers containing the same infested but untreated soil were exposed to identical conditions as the treated soil.

After three days, the containers were opened and portions of the treated and untreated soil cultured by the dilution plate method as described by Martin, J. P. in Soil Science, 69, No. 3, p. 215–32 (March 1950) to determine the percent control of fungal organisms. In the latter operations, the culturing medium employed was a peptone dextrose agar (1000 milliliters of water, 10 grams of dextrose, 5 grams of peptone, 1 gram of $KH_2PO_4$, 0.5 gram of $MgSO_4 \cdot 7H_2O$ and 20 grams of agar) containing 0.069 gram of rose bengal and 0.030 gram of streptomycin per liter of ultimate mixture. In the plating operations, the culturing medium was incorporated with about 0.5 gram of soil sample per liter of medium and the plates thereafter poured in replicates of three for the treated and check soils. The poured plates were then incubated for 3 days at 25° C.

After incubation, the plates were examined and counts of fungal colonies made in order to determine the percent control of the organisms. The results are set forth in the following table.

| Treating Compound | Concentration of Toxicant Compound in Soil Treating Composition in Grams per Liter | Concentration of Treating Compound in Soil in Parts by Weight per Million Parts by Weight of Soil | Percent Control of Fungal Organisms |
|---|---|---|---|
| 1-bromo-2-butanone | 12 | 20 | 98 |
|  | 3 | 5 | 98 |
|  | 1.5 | 2.5 | 87 |
| 1-chloro-2-butanone | 12 | 20 | 100 |
|  | 3 | 5 | 93 |
|  | 0.75 | 1.25 | 80 |
| 1-bromo-3-methyl-2-butanone | 12 | 20 | 96 |
|  | 6 | 10 | 98 |
|  | 3 | 5 | 94 |

Example 4

1-chloro-4-methyl-2-pentanone and 1-bromo-4-methyl-2-pentanone were employed in a determination as described in Example 3 for the treatment of the fungal infested soil previously characterized in Example 1. The treating, mixing, culturing and incubating operations were all as previously described. The compositions employed in the treating operations were acetone solutions containing various amounts of the pentanone compounds per liter of ultimate mixture. The results of the determination are set forth in the following table.

| Treating Compound | Concentration of Toxicant Compound in Soil Treating Composition in Grams per Liter | Concentration of Treating Compound in Soil in Parts by Weight per Million Parts by Weight of Soil | Percent Control of Fungal Organisms |
|---|---|---|---|
| 1-chloro-4-methyl-2-pentanone | 15 | 25 | 100 |
|  | 3 | 5 | 99 |
| 1-bromo-4-methyl-2-pentanone | 12 | 20 | 100 |
|  | 6 | 10 | 100 |
|  | 3 | 5 | 100 |

Example 5

25 parts by weight of 1-chloro-2-hexanone, 70 parts of fuller's earth, 2 parts of an alkyl aryl sulfonate (NACCONOL NR) and 3 parts of a polymerized sodium salt of substituted benzoid alkyl sulfonic acid (Daxad No. 27) are mechanically mixed and ground together to prepare a concentrate composition in the form of a wettable powder.

In a further operation, 95 parts by weight of 1-bromo-2-pentanone and 5 parts of a dimeric alkylated aryl polyether alcohol (Triton X–155) are mechanically mixed together to prepare a concentrate composition in the form of a dispersible liquid.

Also, 25 parts by weight of 1-chloro-3-methyl-2-butanone, 65 parts of xylene and 10 parts of a sorbitan monolaurate polyoxyethylene derivative (Tween 20) are mechanically mixed together to prepare a liquid emulsifiable concentrate composition.

These concentrate compositions may be dispersed in water to prepare aqueous compositions which have very desirable wetting and penetrating properties. The latter aqueous compositions are adapted to be employed to treat soil and disperse the toxicant compounds therein in fungicidal concentrations.

Example 6

1-chloro-4-methyl-2-pentanone was employed for the treatment of sandy loam soil heavily infested with the organisms *Fusarium solani*, *Pythium spp.*, and *Rhizoctonia solani* and having a moisture content of about 50 percent of the field capacity of the soil. In the treating operations, the soil was placed in sealable jars and thereafter separately injected with an acetone solution containing 5 grams of the pentanone compound per liter of ultimate mixture and in amounts sufficient to supply 5 parts by weight of toxicant per million parts by weight of soil. Immediately after treatment, the soil in the jars was seeded to cotton, the jars thereafter sealed and the seeded soil therein mechanically mixed to insure uniform distribution of the toxicant composition. In a check operation, the above infested but untreated soil was placed in jars, the soil seeded with cotton seeds and the jars thereafter sealed. Three days after seeding, the check and treated jars were opened, sufficient water added to each jar to encourage seedling growth and the jars immediately resealed. During the subsequent growing period there was observed no adverse effect upon germination and seedling growth attributable to the toxicant compound.

Ten days after the seeding the jars were opened, the seedlings removed and their roots examined in order to determine the number of disease-free plants. From the examination, 100 percent of the seedlings in the treated soil were found to be free of root-rot disease. In the check soil, all the seedlings were found to be heavily infested with the complex of root-rot fungi.

Example 7

In an exactly comparable operation, the same fungal infested soil was treated with 1-bromo-2-butanone. The mixing, treating and seeding operations and subsequent growth conditions were all as previously described in Example 6. In the treating operations, the soil was injected with aqueous solutions containing 12 grams of the butanone compound per liter of ultimate mixture and in an amount sufficient to supply 25 parts by weight of toxicant per million parts by weight of soil.

Ten days after seeding, the seedlings were removed from the soil and their roots examined in order to determine the number of disease-free plants. The observations showed that 100 percent of the seedlings from the treated soil were free of root-rot disease while all the seedlings from the check soil were found to be heavily infested with the complex of root-rot fungi.

Example 8

1-bromo-2-butanone was employed for the treatment of the fungal infested soil of Example 1. In the treating operations, the soil was placed in sealable vessels and separately injected with an aqueous solution containing 3 grams of the toxicant compound per liter of ultimate composition and in an amount sufficient to supply 5 parts by weight of toxicant per million parts by weight of soil. The vessels were then sealed and the soil therein mechanically mixed to ensure uniform distribution of the toxicant composition. After one-half hour of mixing, the soil was removed from the vessels, spread in flats to a depth of about 3 inches and planted with sugar beet seed units. In a check operation, the same infested but untreated soil was similarly spread in flats and seeded with sugar beet seed units. The flats of seeded soil were then placed in a lath-house where they were exposed to maximum daily temperatures of about 75° F. and watered in an amount adequate for germination and growth. During the growing period there was observed no adverse effect upon germination and growth of seedlings attributable to the butanone compound.

Four weeks after planting, the flats were inspected to determine the number of seedlings emerged. In the treated flats an emergence of 97 seedlings for each 100 planted seed units was observed. In the check flats there was an emergence of 35 seedlings for each 100 planted seed units.

Example 9

1-bromo-3-methyl-2-butanone was dissolved in water to prepare an aqueous composition containing 0.17 pound of toxicant per 25 gallons of ultimate mixture. This composition was employed for the treatment of seed beds heavily infested with the fungus organisms *Fusarium solani, Pythium spp.,* and *Rhizoctonia solani.* At the time of treatment the soil in the seed beds had a moisture content equal to about 75 percent of the field capacity. Prior to treatment, the seed beds had been furrowed for seeding with sugar beet seed units. In the treating operations, the bottoms and sides of the furrows were sprayed with the toxicant composition at a dosage of 25 gallons of aqueous composition per acre of furrow soil surface and the soil compacted about the seed units according to conventional planting practices. In a check operation, seed beds of the same infested but untreated soil were similarly planted with sugar beet seed units. During the subsequent growing period there was observed no adverse effect upon the germination and growth of seedlings attributable to the butanone compound.

Five weeks after seeding, the seed beds were inspected to determine the number of seedlings emerged from each 100 planted seed units. In the treated beds an emergence of 121 seedlings for each 100 planted seed units was observed. In the check beds there was found an emergence of only 18 seedlings for each 100 planted seed units.

Example 10

The dispersible liquid concentrate composition of Example 5 is dispersed in water to prepare a composition containing 100 pounds of 1-chloro-2-pentanone per 200 gallons of ultimate mixture. The latter composition while under agitation is metered into irrigation water at the pump outlet at the rate of 5 gallons per 1000 gallons of irrigation water. The water is in a state of turbulent flow as it comes from the pump which provides for thorough mixing of the toxicant composition therein. About 3 acre inches of the irrigation water is applied to a sandy loam soil heavily infested with *Fusarium solani, Pythium spp.,* and *Rhizoctonia solani.* This treatment accomplishes a wetting of the soil to a depth of about 2 feet to provide a concentration of about 23 parts by weight of 1-chloro-2-pentanone per million parts by weight of soil. One week following the irrigation, the soil was seeded to lima beans. Five weeks after seeding, the resulting stand of bean plants was examined and found to be substantially free of fungal disease.

The expressions "growth media" or "soil" are employed in the present specification and claims in their broadest sense to be inclusive of all conventional "soils," as defined in Websters New International Dictionary, second edition, unabridged, published in 1937 by G. and C. Merriam Company, Springfield, Massachusetts. Thus, the terms refer to any substances or media in which vegetation may take root and grow, and are intended to include not only earth, but compost, manure, muck, humus, sand and the like, adapted to support plant growth.

I claim:

1. An agronomical practice which comprises impregnating fungus infected soil with from 5 to 50 parts by weight of a haloketone compound per million parts by weight of the soil and thereafter planting in the treated soil, the haloketone compound being characterized by the formula

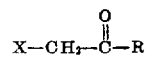

wherein X is a member of the group consisting of chlorine and bromine and R is an alkyl radical containing from 2 to 4 carbon atoms, inclusive.

2. An agronomical practice which comprises applying to and mixing with fungus infected soil a fungicidal amount of a compound of the formula

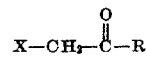

wherein X is a member of the group consisting of chlorine and bromine and R is an alkyl radical containing from 2 to 4 carbon atoms, inclusive.

3. In the practice of agricultural economy, the method which comprises impregnating fungus infected soil with a haloketone compound of the formula

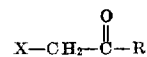

wherein X is a member of the group consisting of chlorine and bromine and R is an alkyl radical containing from 2 to 4 carbon atoms, inclusive, the impregnation being carried out to a depth of at least two inches below the soil surface and at a relatively uniform dosage of from 5 to 50 parts by weight of the haloketone compound per million parts by weight of soil.

4. An agronomical practice which comprises impregnating fungus infected soil with from 5 to 50 parts by weight of 1-chloro-2-butanone per million parts by weight of soil.

5. An agronomical practice which comprises impregnating fungus infected soil with from 5 to 50 parts by weight of 1-bromo-2-butanone per million parts by weight of soil.

6. An agronomical practice which comprises impregnating fungus infected soil with from 5 to 50 parts by weight of 1-bromo-3-methyl-2-butanone per million parts by weight of soil.

7. An agronomical practice which comprises impregnating fungus infected soil with from 5 to 50 parts by weigh of 1-bromo-4-methyl-2-pentanone per million parts by weight of soil.

8. An agronomical practice which comprises impregnating fungus infected soil with from 5 to 50 parts by weight of 1-chloro-4-methyl-2-pentanone per million parts by weight of soil.

References Cited in the file of this patent

UNITED STATES PATENTS 2,201,259     Calkins _____ May 21, 1940

OTHER REFERENCES

Donald E. H. Frear: Chemistry of Insecticides, Fungicides and Herbicides, pages 108–125.

Roark et al.: U. S. Dept. of Agri. Tech. Bull. 162, March 1929, pages 1, 20 and 21.

U. S. DEPARTMENT OF COMMERCE
PATENT OFFICE
CERTIFICATE OF CORRECTION

Patent No. 2,802,768

August 13, 1957

Lloyd J. Meuli

It is hereby certified that error appears in the printed specification of the above numbered patent requiring correction and that the said Letters Patent should read as corrected below.

Column 8, lines 19, 34, 44, 59, 63, 67, 71 and 75, for "fungus infected", each occurrence, read -- fungus infested --.

Signed and sealed this 18th day of March 1958.

(SEAL)
Attest:

KARL H. AXLINE

Attesting Officer

ROBERT C. WATSON
Commissioner of Patents